United States Patent [19]
Rao et al.

[11] Patent Number: 5,685,138
[45] Date of Patent: Nov. 11, 1997

[54] INTEGRATED DRYING OF FEEDSTOCK FEED TO IGCC PLANT

[75] Inventors: Ashok D. Rao, Santa Margarita, Calif.; David C. Goodland, Morristown, Tenn.

[73] Assignee: Fluor Corporation, Irvine, Calif.

[21] Appl. No.: 386,008

[22] Filed: Feb. 9, 1995

[51] Int. Cl.[6] .................................................. F02C 3/28
[52] U.S. Cl. ................................... 60/39.02; 60/39.12
[58] Field of Search .......................... 60/39.02, 39.05, 60/39.12, 39.461, 39.464

[56] References Cited

U.S. PATENT DOCUMENTS

| | | | |
|---|---|---|---|
| 3,990,229 | 11/1976 | Staege | 60/39.12 |
| 4,284,476 | 8/1981 | Wegener et al. | 201/39 |
| 4,976,101 | 12/1990 | Schiffers et al. | 60/39.12 |

Primary Examiner—Louis J. Casaregola
Attorney, Agent, or Firm—Crockett & Fish

[57] ABSTRACT

In a combined cycle gasification plant, high pressure fuel gas from the gasification unit is heated prior to combustion, and is then used to dry the feedstock. The moist fuel gas from the drying operation is combusted to drive the turbine. Alternatively, high-pressure inert gas such as nitrogen is heated in the gasification unit and is then used to dry the coal feed. Some of the moist inert gas is recycled, and some if it is passed to the combustion turbine.

4 Claims, 5 Drawing Sheets

5,685,138

1

INTEGRATED DRYING OF FEEDSTOCK FEED TO IGCC PLANT

BACKGROUND OF THE INVENTION

The present invention relates to coal gasification, as well as gasification of other feedstocks including biomass such as agricultural products or wastes, and municipal wastes such as sewage and trash.

Gasification of feedstocks and subsequent combustion of the gas in a blast furnace, combustion chamber of a gas turbine, or in some other manner, are well known. In the exemplary case of coal as the feedstock, most gasification processes are advantageously accomplished using relatively dry coal, and since almost all coals as mined contain appreciable quantities of water, it is advantageous to dry the coal in an efficient manner. The need for efficient drying is especially important when using sub-bituminous, lignite, and brown coals, as these coals often contain between about 20% and about 65% weight water.

In existing practice the drying of coal and other feedstocks is accomplished by passing flue gas, heated inert gas, or superheated steam through the drying unit. Use of flue gas in this manner is inherently inefficient in that both the water vapor produced and the energy in the water vapor are typically vented and lost to the system. In addition, production and heating of the flue gas consume a portion of the clean fuel gas produced from gasification. Inert-gas drying is also inherently inefficient in that the inert gas is typically heated using steam which could otherwise have been employed to produce work in the expansion turbines. When superheated steam is used to dry the feedstock, there is inefficiency resulting in reduction of steam to the steam turbine. Thus, while numerous methods of drying coal and other feedstocks are known, it is desirable to reduce or eliminate any reduction to the efficiency of the system caused by drying of the feedstock.

Accordingly, there is a need to provide a more efficient means of drying coal and/or other feedstocks in gasification-based power plants using combustion turbines. Other and further objects and advantages will appear hereinafter.

SUMMARY OF THE INVENTION

To these ends, product fuel gas at a pressure in excess of about 100 psia from gasification and/or fuel units is heated prior to combustion in a combustion turbine, and at least some of the heated fuel gas is used to dry the feedstock prior to being introduced into the gasification and/or fuel units. The fuel gas thus utilized contains water vapor from the dryer, and is sent to the combustion turbine in place of water-based vapor which would otherwise have been added to the fuel gas as a means of reducing the flame temperature of the turbine inlet and/or to cause a reduction in $NO_x$ emissions. A relatively large percentage of the heat within the stream used to dry the coal is thus kept within the system, thereby increasing efficiency. Alternatively, an inert gas such as high-pressure nitrogen may be heated and used to dry the feedstock, with most or all of the humid inert gas being fed into the combustor of the combustion turbine. As used herein, high pressure refers to pressures in excess of about 100 psia. In other aspects of the invention, energy used to heat the fuel gas or high-pressure nitrogen may be drawn from cooling streams in the gasification and treating units, with the remainder of the energy being supplied mostly by low pressure steam. This lessens the reduction in high pressure steam going to the expansion steam turbine, and thereby further increases the overall efficiency of the system.

2

BRIEF DESCRIPTION OF THE DRAWINGS

In the drawings, wherein similar reference characters denote similar elements throughout the several views.

DETAILED DESCRIPTION OF THE DRAWINGS

Figure 1:
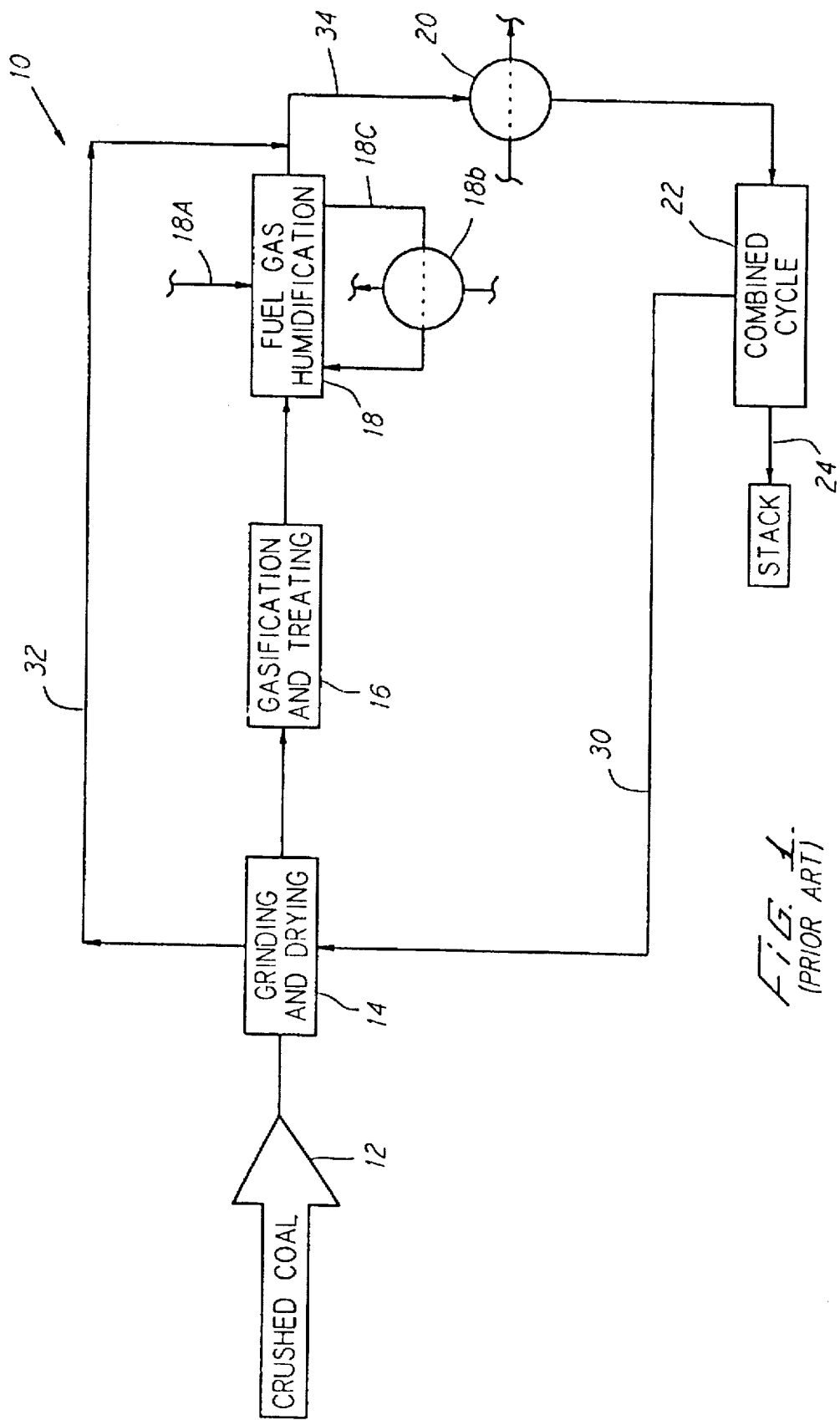
FIG. 1 is a schematic of a prior art Integrated Combined Cycle Gasification Plant using steam to dry the feedstock.

In the prior art system of FIG. 1, superheated steam is used to dry a feedstock such as coal prior to gasification. Where coal is used as the feedstock, crushed coal 12 is fed into grinding and drying unit 14, with the ground and dried coal being fed into a gasification and treating unit 16 to produce fuel gas. The fuel gas is then humidified in humidification unit 18, with makeup water being added through line 18A, and additional heat required for humidification being added in heat exchanger 18B through line 18C. Heat for heat exchanger 18B and other heat exchangers identified herein may be supplied by steam, hot boiler feed water, or one or more other heat sources. The humid fuel gas then travels along line 34 to heat exchanger 20, and the preheated fuel gas is fed into the combustor of a combustion turbine in combined cycle unit 22. Flue gas escapes to the stack via line 24.

In the prior art process, drying of the feedstock thus occurs at high pressure, as a result of shunting a portion of the superheated steam produced in the combined cycle unit 22 to the grinding and drying unit 14 via line 30. The shunted steam is thereby cooled, and the reduced temperature steam exits grinding and drying unit 14 along line 32. The low temperature steam is then combined with the output of the fuel gas humidification unit 18, and passed to the combustor.

Figure 2:
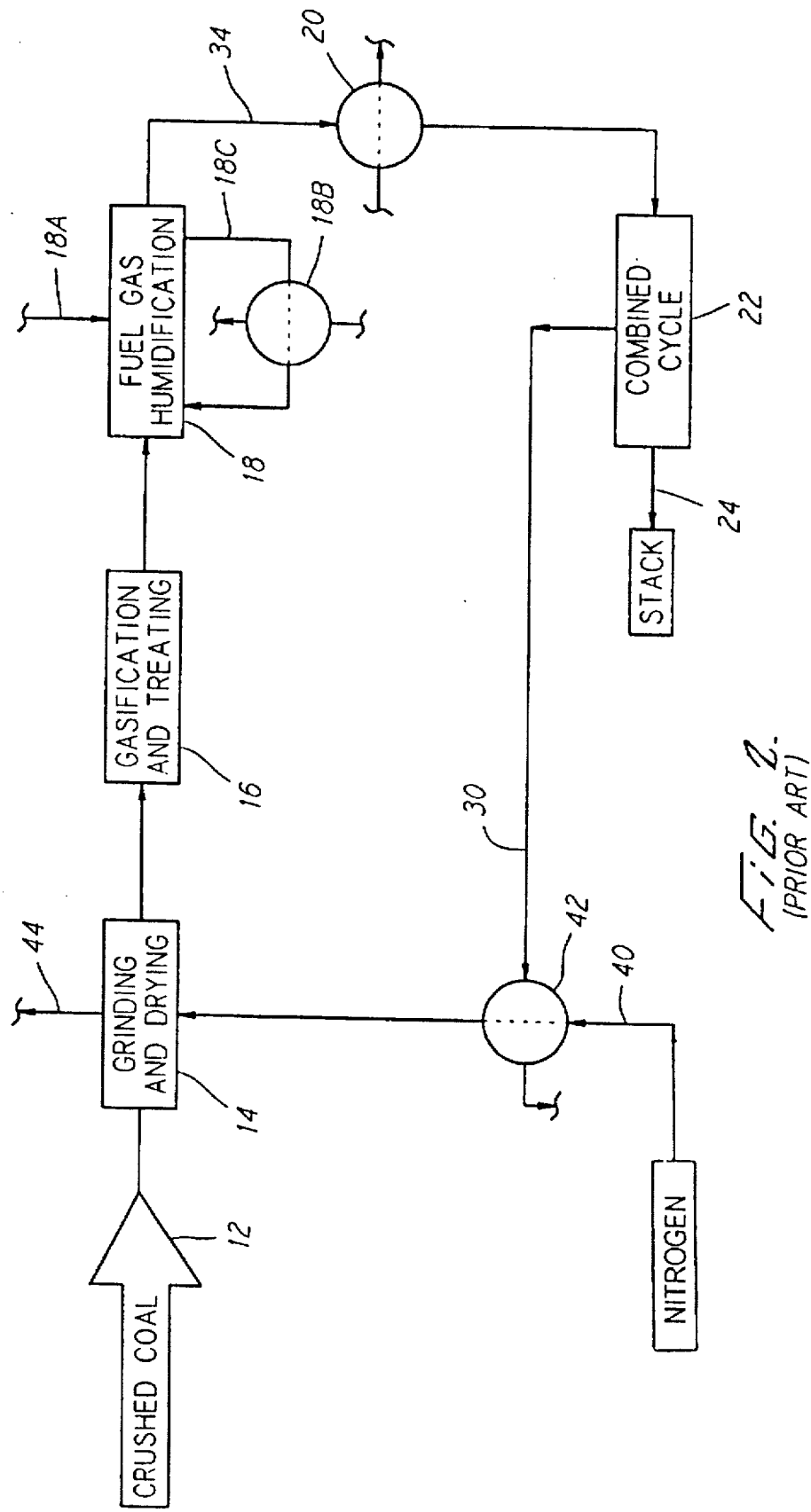
FIG. 2 is a schematic of a prior art Integrated Combined Cycle Gasification Plant using inert gas to dry the feedstock.

The prior art system of FIG. 2 is similar to that of FIG. 1, except that the drying is conducted at atmospheric pressure, and steam traveling along line 30 passes through heat exchanger 42, where its heat energy is used to heat an inert gas such as nitrogen. The heated inert gas is then sent to the grinding and drying unit 14 where it is used to dry the feedstock. This cools the inert gas, which then escapes as an exhaust in line 44.

Figure 3:
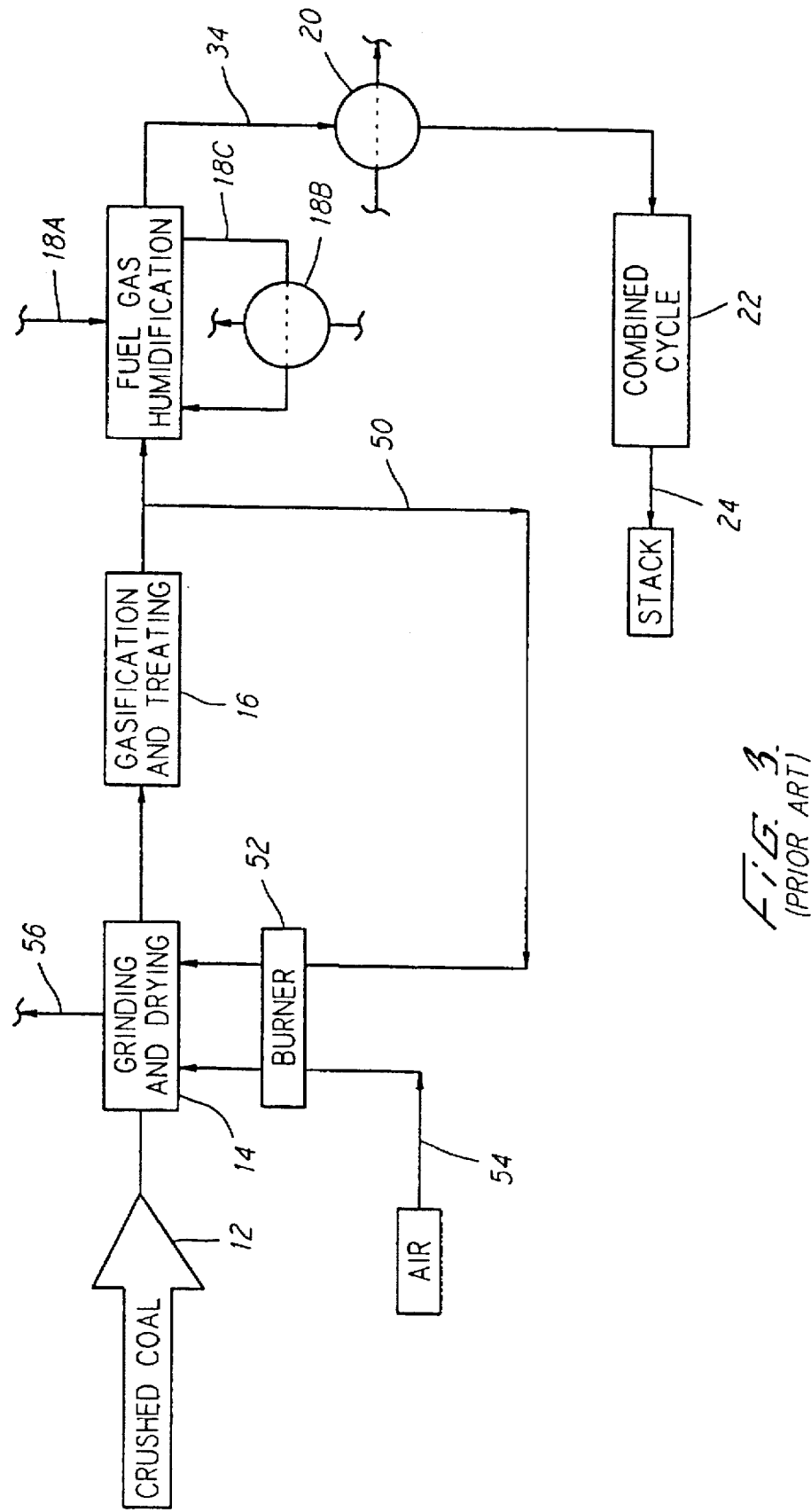
FIG. 3 is a schematic of a prior art Integrated Combined Cycle Gasification Plant using flue gas to dry the feedstock.

The prior art system of FIG. 3 is again similar to FIG. 1, except that a portion of the clean fuel gas exiting the gasification and treating unit 16 is shunted along line 50 to burner 52, with the exhaust of burner 52 entering grinding and atmospheric drying unit 14 to dry the feedstock. Fresh air utilized by burner 52 enters via line 54, and the cooled exhaust gas exits the system via line 56.

As discussed above, the prior art systems of FIGS. 1–3 are inefficient in that a significant portion of the energy in a portion of the superheated steam is used to dry the feedstock rather than to produce electricity or perform other useful work.

Figure 4:
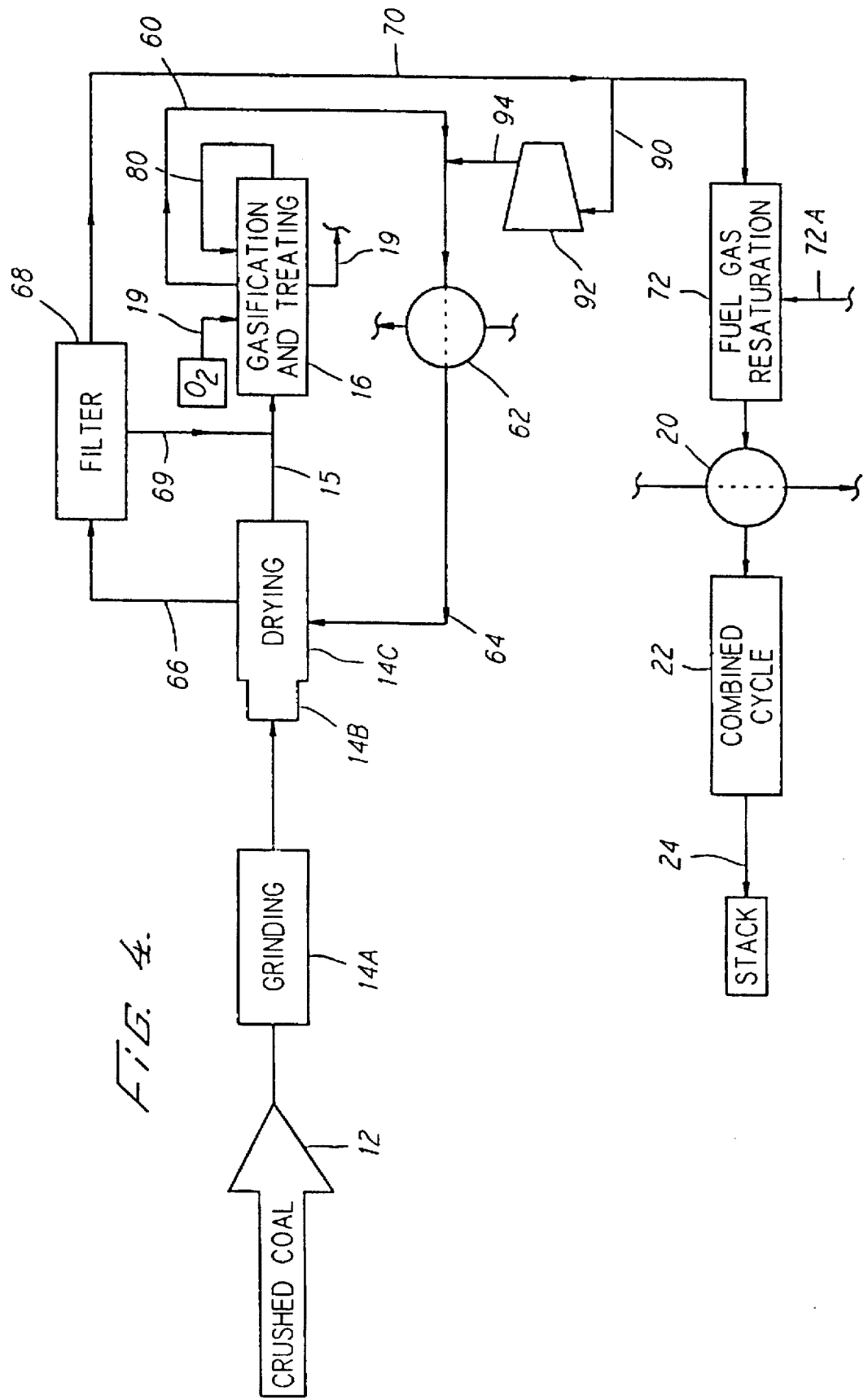
FIG. 4 is a schematic of an Integrated Combined Cycle Gasification Plant using fuel gas to dry the feedstock.

In FIG. 4, heated fuel gas is used to dry a feedstock such as coal at elevated pressure. Where coal is used as the feedstock, crushed coal travels along line 12, enters the grinding unit 14A, passes through lock hoppers 14B, and enters the drying unit 14C. The ground, dried coal then passes along line 15 through the gasification and treating unit 16, where it is used to produce fuel gas. Oxygen is added to the gasification and treating unit 16 via line 17, and ash and slag are removed via line 19. The fuel gas passes along line 60 to heat exchanger 62, and thence along line 64 to drying unit 14C where it is used to dry the coal. In drying the coal, the fuel gas picks up humidity, and the humid gas travels along line 66 to a filter 68, and thence along line 70 to a fuel gas resaturator 72, if required. Makeup water is added along line 72A as appropriate. The resaturated gas is then reheated in heat exchanger 20, and is combusted in combined cycle unit 22, with flue gas escaping in line 24.

A portion of the humid fuel gas traveling line 70 can be recycled. This is accomplished by shunting humid fuel gas via line 90 to compressor 92, and thence along line 94 where it joins preheated fuel gas in line 60 which is being used to dry the coal. Also in this process, particulate matter from filter 68 is carried along line 69 to line 15, where it is fed into gasification and treating unit 16.

Figure 5:
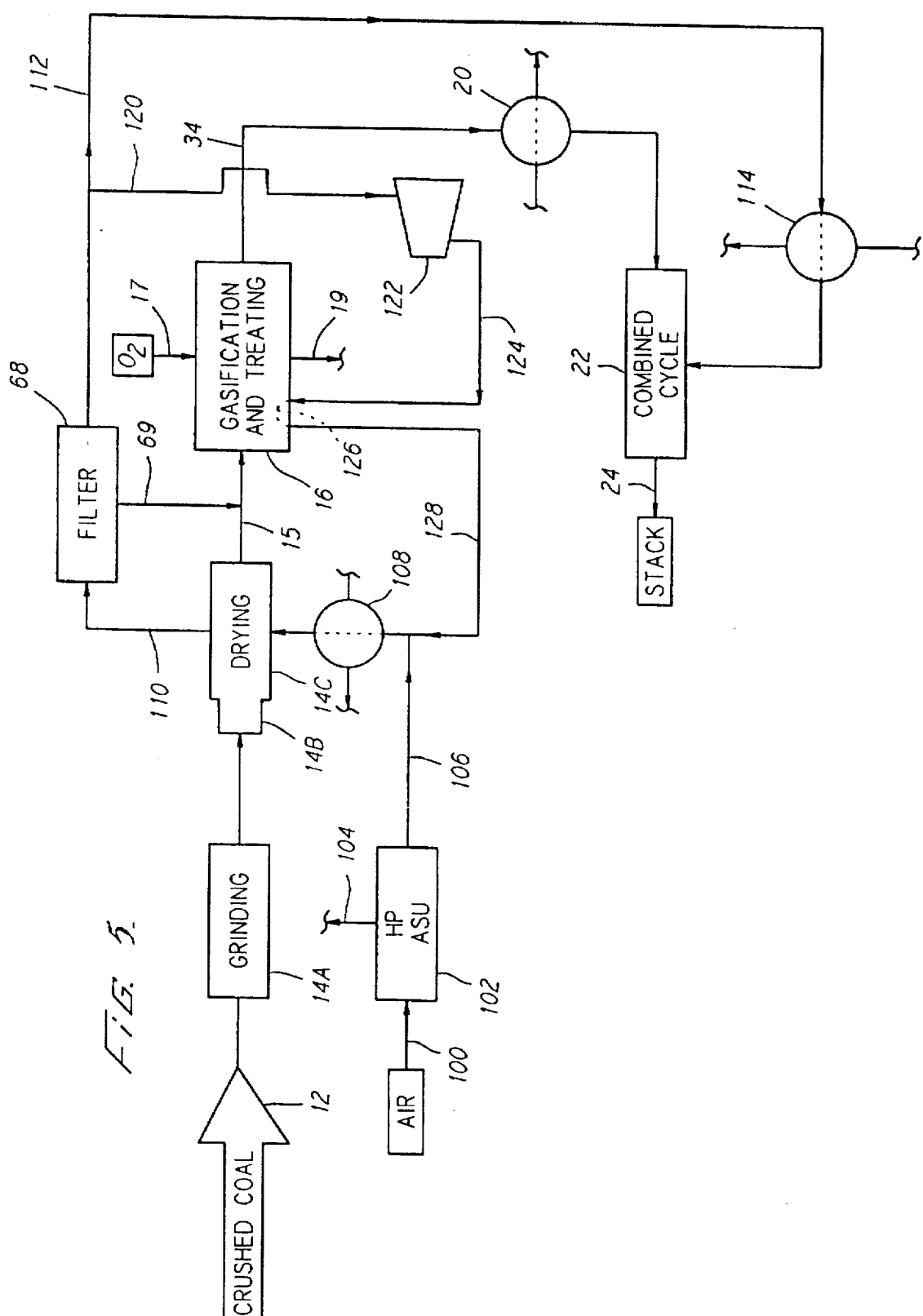
FIG. 5 is a schematic of an Integrated Combined Cycle Gasification Plant using high pressure nitrogen to dry the feedstock.

The schematic in FIG. 5 is similar to FIG. 4 except, among other things, that a heated high pressure inert gas such as nitrogen is used to dry the coal, with much of the energy used to heat the inert gas coming from cooling streams in the gasification and treating unit 16. In the case of coal, crushed coal traveling along line 12 enters grinding unit 14A, passes through lock hoppers 14B and into the high pressure drying unit 14C. The dried coal passes along line 15 to gasification and treating unit 16. Fuel gas produced in the gasification and treating unit 16 passes along line 34 to heat exchanger 20, and is then combusted in combined cycle unit 22 with flue gas escaping along line 24. Oxygen is added to the gasification unit along line 17, and ash and slag are carried away from the unit along line 19.

Where nitrogen is used to dry the coal, the nitrogen is preferably extracted in an elevated pressure air separation unit 102, with the extracted oxygen traveling along line 104 to the $O_2$ blown gasifiers, and entering the gasifiers along line 17. The extracted nitrogen travels via line 106 to heat exchanger 108, where it is heated and then introduced into drying unit 14C. The nitrogen picks up humidity in drying unit 14C, and passes along line 110 to filter 68.

The remainder of the nitrogen is recycled. It passes via line 120 to compressor 122, thence via line 124 to the gasification and treating unit 16 where it picks up heat in line 126, and is then passed to the heat exchanger 108 and the drying unit 14C via line 128. Saturation of the fuel gas or resaturation of the nitrogen prior to preheat in exchangers 20 and 114, respectively, may be included if required.

As in FIG. 4, particulates from filter 68 of FIG. 5 may be carried along line 69 to line 15, where they are fed into gasification and treating unit 16. Fuel gas flowing to filter 68 travels along line 112 to heat exchanger 114 where it is reheated, and then added to the combustor of the combustion turbine in the combined cycle unit 22.

Calculations on the increased efficiency of the methods and systems of an integrated drying plant as disclosed in FIGS. 4 and 5 are shown below. The overall heat rate is calculated to be approximately 8.2% below the system of FIG. 3, and at least approximately 3.6% below the system of FIG. 2.

Basis
17,000 ST/D Lignite
34.9% moisture
Clean Fuel Gas (Shell Gasification) Available for Gas Turbine (G.T.)

| | |
|---|---|
| $H_2$ | 18,554.3 Moles/Hr |
| $CO_2$ | 39,505.1 Moles/Hr |
| $CO_2$ | 2911.5 Moles/Hr |
| $H_2S$ + COS | 0.9 Moles/Hr |
| $N_2$ + Ar | 3710.7 Moles/Hr |
| $H_2O$ | 218.9 Moles/Hr |
| | 64,901.4 Moles/Hr |

Conventional Plant
 (1) IP Steam required for drying=208.85 MM Btu/Hr.
 (2) Fuel gas required for drying=413.36 MM Btu/Hr. (HHV)
 (3) LHV of fuel gas before saturation=275 Btu/SCF (or 289 Btu/SCF HHV)
 (4) $H_2O$ required to reduce LHV to 130 Btu/SCF (for $NO_x$ control in G.T.) in fuel gas saturation=(275−130)/130×64,901.4 Moles/Hr.=72,390 Moles/Hr.
 (5) Heat required for saturator=(72,390−218.9)×18,015 lb/Hr.×1150 Btu/lb=1,495 MM Btu/Hr.
 (6) Heat Rate=9,983 Btu/Kw Hr.
 (7) Net Plant Output=(17,000×2000/24 lb/Hr.×6826 Btu/lb÷(9,983 Btu/KwHr)=969 MW
Integrated Drying Plant
 (1) Moisture removed from coal=Moisture added to fuel gas=17,000×2000/24 (0.349−(0.09/(1−0.09))(1−0.0349))= 403.205 Lb/Hr.=22,382 Moles/Hr (<72,390 Moles/Hr. required for 130 Btu/SCF)
 (2) Extra fuel available for G.T.=savings in drying operation=413.36 MM Btu/Hr. (HHV)
 (3) Corresponding increase in combined cycle output= 413.36/3.413×0.55 MW (conservative efficiency of 0.55 for MBG)=67 MW
 (4) Extra steam duty available for steam turbine=savings in drying operation+savings in fuel gas saturation=(208.85) +(1495−1495)=208.55 MM Btu/Hr.
 (5) Corresponding increase in steam turbine output= 208.55/3.413×0.2 MW (conservative efficiency of 0.2 for IP steam)=12.2 MW
 (6) Total increase in power output=67 MW+12 MW=79 MW
 (7) Relative increase in output or decrease in heat rate over conventional plant=79 MW/969 MW×100%=8.2%
 (8) For a conservative estimate, it will be assumed that the coal will be dried in the conventional plant with all steam and no fuel gas combustion
 (9) Extra steam duty available for Steam Turbine=savings in drying=413.36 (corresponding to fuel energy) MM Btu/ Hr.+275 LHV/289 HHV+208.55 (corresponding to IP steam energy) MM Btu/Hr.=602 MM Btu/Hr.
 (10) Corresponding increase in Steam Turbine output= 602/3.413×0.2 MW=35 MW
 (11) Relative Increase in output or decrease in heat rate over conventional plant=35 MW/969 MW×100%=3.6%

Thus, a method and system for drying coal in a gasification-based power plant using combustion turbines has been disclosed. While specific embodiments and applications of this invention have been shown and described, it would be apparent to those skilled in the art that many more modifications are possible without departing from the inventive concepts herein. The invention therefore is not to be restricted except in the spirit of the appended claims.

What is claimed is:

1. A method for increasing the efficiency of a power plant using a moisture containing feedstock as a fuel, the method comprising:

gasifying an amount of said feedstock in a gasification unit to produce a high pressure fuel gas;

heating at least a portion of said high pressure fuel gas;

using at least a part of said heated fuel gas to dry said feedstock in a drying unit, thereby producing a humid gas; and burning said humid gas in a combustion chamber to power an expansion turbine.

2. The method of claim 1, wherein said feedstock comprises at least one of coal, agricultural products, and municipal wastes.

3. An improved gasification power plant having a feedstock drying unit, a gasification unit producing a high pressure fuel gas from the feedstock, and a combustion turbine, the improvement comprising:

a heat exchanger;

a pathway conducting a portion of said fuel gas sequentially from said gasification unit to said heat exchanger, from said heat exchanger to said drying unit, and from said drying unit to said combustion turbine.

4. The power plant of claim 3, wherein said feedstock comprises at least one of coal, agricultural products and municipal wastes.

* * * * *